(12) United States Patent
Crosby, Jr. et al.

(10) Patent No.: US 6,259,850 B1
(45) Date of Patent: Jul. 10, 2001

(54) CROSSCONNECT MODULE HAVING MONITORING PROVISIONS

(75) Inventors: Marshall E. Crosby, Jr., Alpharetta; Ronald Hergenroder, Bartow, both of GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/426,606

(22) Filed: Oct. 26, 1999

(51) Int. Cl.[7] .................................................. G02B 6/00
(52) U.S. Cl. ............................. 385/134; 385/16; 385/24
(58) Field of Search .................................. 385/15, 16, 24, 385/27, 28, 134, 135, 147

(56) References Cited

U.S. PATENT DOCUMENTS

| | | | |
|---|---|---|---|
| 5,231,687 | * 7/1993 | Handley | 385/139 |
| 5,432,875 | 7/1995 | Korkowski et al. | 385/27 |
| 5,774,245 | 6/1998 | Baker | 359/128 |

* cited by examiner

Primary Examiner—Cassandra Spyrou
Assistant Examiner—Euncha Cherry
(74) Attorney, Agent, or Firm—Thomas, Kayden, Horstemeyer & Risley, LLP

(57) ABSTRACT

The present disclosure relates to a crossconnect module that comprises a housing adapted for mounting within a crossconnect panel. In an example embodiment, the module includes first and second transmitting connectors connected to each other with a first transmission path and first and second receiving connectors connected to each other with a second transmission path. Further included is a monitoring connector, a signal splitter disposed within the housing along one of the first and second transmission paths, and a third transmission path extending from the signal splitter to the monitoring connector. In use, a portion of a signal transmitted along one of the first and second transmission paths is diverted by the signal splitter to the third transmission path so that the diverted portion of the signal can be monitored via the monitoring connector.

10 Claims, 4 Drawing Sheets

CROSSCONNECT MODULE HAVING MONITORING PROVISIONS

TECHNICAL FIELD OF THE INVENTION

The present invention generally relates to a crossconnect module having monitoring provisions. More particularly, the present invention relates to a non-intrusive, passive crossconnect module that provides for transmission signal monitoring and which can be installed in a standard bay panel.

BACKGROUND OF THE INVENTION

Fiber optic peripheral equipment for cable management, cable storage, and connection capabilities are well known. Typically, this cable management, storage and connection is facilitated in bays that comprise a plurality of stacked shelves in which fiber optic crossconnect panels are installed. Within each panel is a plurality of stations that are adapted to receive crossconnect modules that facilitate the various optical fiber connections. Each module normally comprises a plurality of "patch throughs" that merely consist of a plurality of connectors installed in a panel that are used to connect two optical fiber connectors so that the pieces of equipment connected to these fibers can transmit and receive signals to and from each other. Several such connections may be made between a transmitter, e.g. a core network, of the signal and the receiver, e.g. a customer premise.

With the multiplicity of fiber optical connections made along any given transmission path, several transmission problems can arise. One problem involves locating a fault point in situations where transmission losses are occurring. For example, if a customer notifies a signal provider that a signal being transmitted to the customer is not arriving or is being corrupted in some manner, the provider normally must determine where along the transmission path the problem is arising. This typically requires checking the output of each connection point along the transmission path to ensure that an uncorrupted signal is being sent from each connection point. In this manner, the problem area along the transmission path can be isolated and the problem remedied.

Separate monitoring devices are usually used to evaluate the output signals to check their integrity. To conduct such an evaluation, the circuit in which the signal is being transmitted normally must be interrupted and several jumper cables attached between the connection point and the monitoring device. At this point, a diagnostic test can be performed to judge transmission performance. Although effective in identifying the problem area, this method is disruptive because the customer's signal must first be interrupted when connecting the device. In addition, this method creates difficulty in that, due to the several jumper connections presently required, it is easy for the technician to confuse the various jumpers and connectors and, therefore, make an erroneous assessment of the transmission performance based upon the wrong signal. Moreover, the customer often must incur additional expense to provide for additional equipment space (e.g., panel space or floor space) for the devices used to check the signals.

From the foregoing, it can be appreciated that it would be desirable to have a monitoring point that is integrated into transmission circuits so that signal interruption and technician confusion can be avoided. Furthermore, it would be desirable to have such a monitoring point integrated into crossconnect panels so that no fiber optic density is lost through the provision of the monitoring point.

SUMMARY OF THE INVENTION

The present disclosure relates to a crossconnect module that comprises a housing adapted for mounting within a crossconnect panel. In one embodiment, the module includes first and second transmitting connectors connected to each other with a first transmission path and first and second receiving connectors connected to each other with a second transmission path. Further included is a monitoring connector, a signal splitter disposed within the housing along one of the first and second transmission paths, and a third transmission path extending from the signal splitter to the monitoring connector.

In use, a portion of a signal transmitted along one of the first and second transmission paths is diverted by the signal splitter to the third transmission path so that the diverted portion of the signal can be monitored with a monitoring device that can, for example, comprise a conventional monitoring device via the monitoring connector to determine whether a uncorrupted signal is being sent through the module. In one arrangement, the signal splitter is disposed along the first transmission path such that the monitored signal is an output signal.

The features and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION OF THE DRAWINGS

Figure 1:
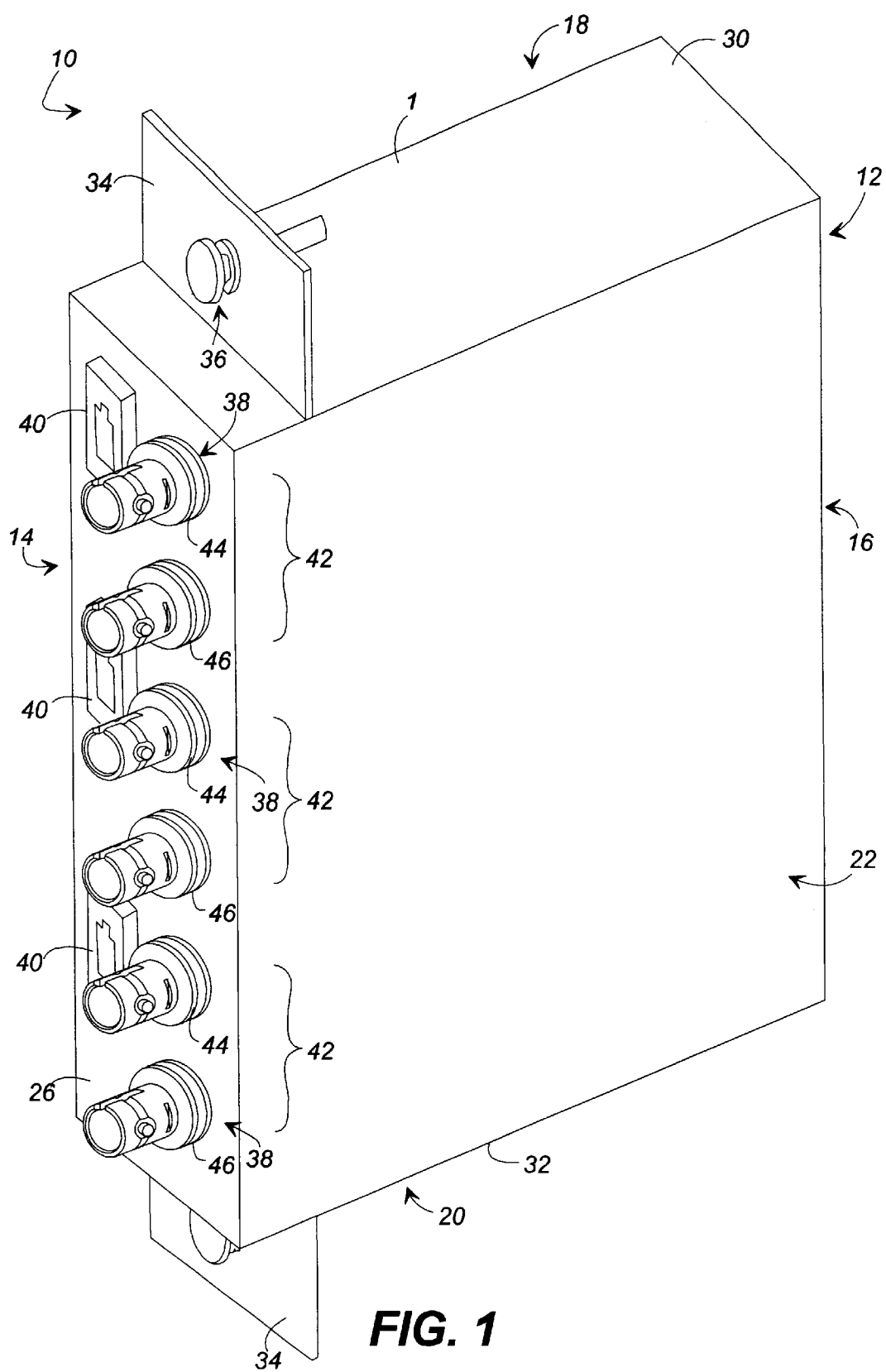
FIG. 1 is a front perspective view of an embodiment of a crossconnect module constructed in accordance with the present invention.
Figure 2:
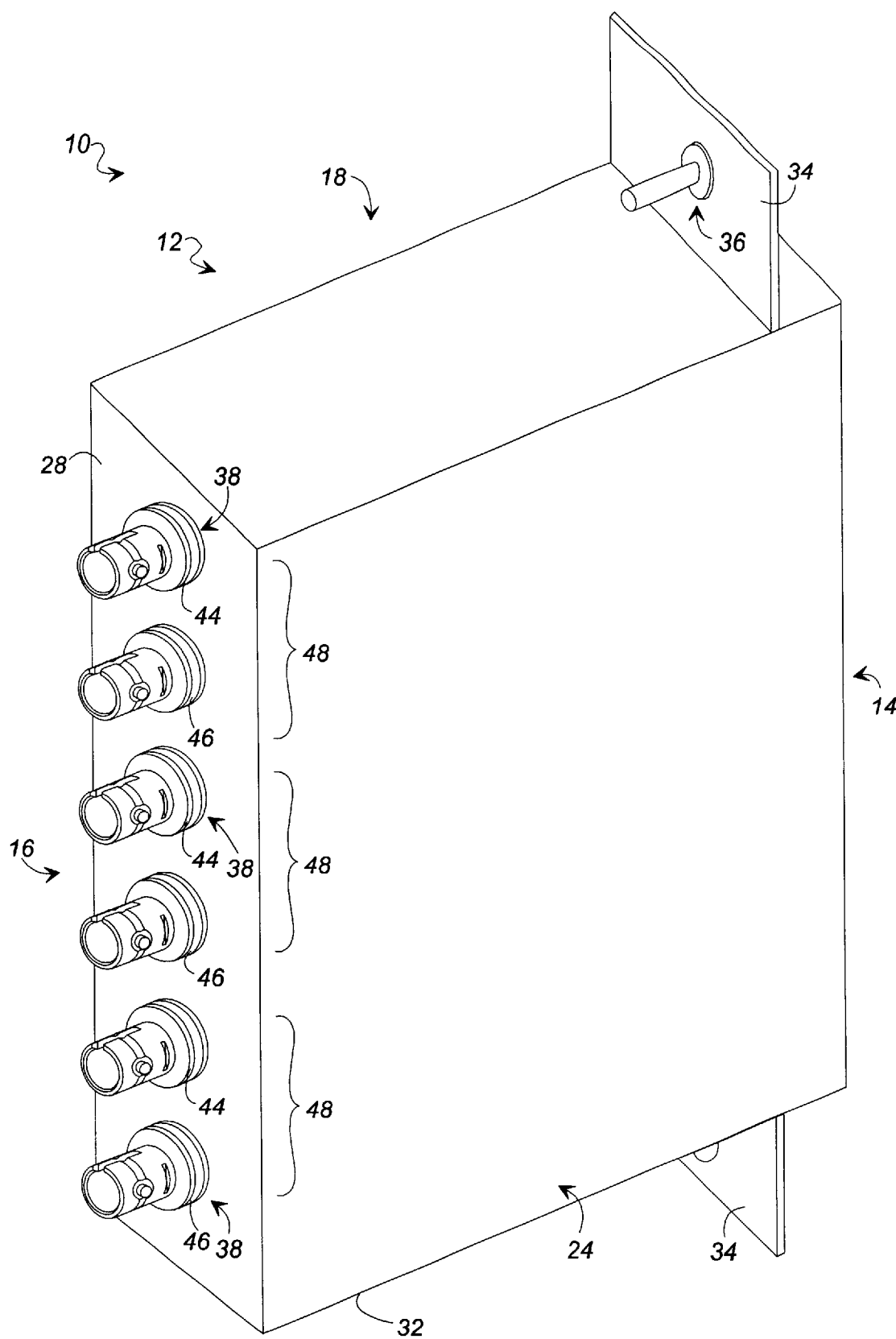
FIG. 2 is a rear perspective view of the crossconnect module shown in FIG. 1.

Referring now in more detail to the drawings, in which like numerals indicate corresponding parts throughout the several views, FIGS. 1 and 2 illustrate an embodiment of a crossconnect module 10 constructed in accordance with the present invention. As is shown in these figures, the crossconnect module 10 comprises a housing 12 that typically is constructed of a sheet metal material. The housing 12 generally comprises a front side 14, a rear side 16, a top side 18, a bottom side 20, and opposed lateral sides 22 and 24. Each of these sides normally includes a panel. In particular, the front side 14 includes a front panel 26, the rear side 16 includes a rear panel 28, the top side 18 includes a top panel 30, and the bottom side 20 includes a bottom panel 32. Extending outwardly from the top and bottom panels 30 and 32 are mounting flanges 34. These mounting flanges 34 are used to mount the bay module 10 into a bay panel (see FIG. 4). This mounting is facilitated with mounting fasteners 36 which extend through the mounting flanges 34. Typically, these mounting fasteners 36 comprise plastic quick-release fasteners, which are well known fasteners.

As indicated in FIG. 1, a plurality of fiber optic connectors are mounted in the front panel 26 of the module 10. More specifically, the front panel 26 includes a plurality of circuit connectors 38 and monitoring connectors 40. In the example embodiment disclosed herein, the circuit connectors 38 are arranged linearly in a row that extends from the top side 18 to the bottom side 20 of the crossconnect module 10. As will be discussed hereinafter, the circuit connectors 38 are arranged in pairs 42 which each comprises a transmitting connector 44 and a receiving connector 46. By way of example, each of the circuit connectors 38 can comprise an SC connector presently available from Lucent Technologies Inc. By further way of example, each of the monitoring connectors 40 can comprise LC connectors also currently available from Lucent Technologies Inc.

As is illustrated in FIG. 2, the rear panel 28 similarly is provided with a plurality of circuit connectors 38. Again, these circuit connectors 38 are arranged linearly in a row that extends from the top side 18 to the bottom side 20 of the crossconnect module 10. In addition, these connectors 38 are arranged in a plurality of pairs 48 that each comprises a transmitting connector 44 and a receiving connector 46. Similar to the circuit connectors 38 provided on the front panel 26, the circuit connectors mounted in the rear panel 28 normally comprise SC connectors.

Figure 3:
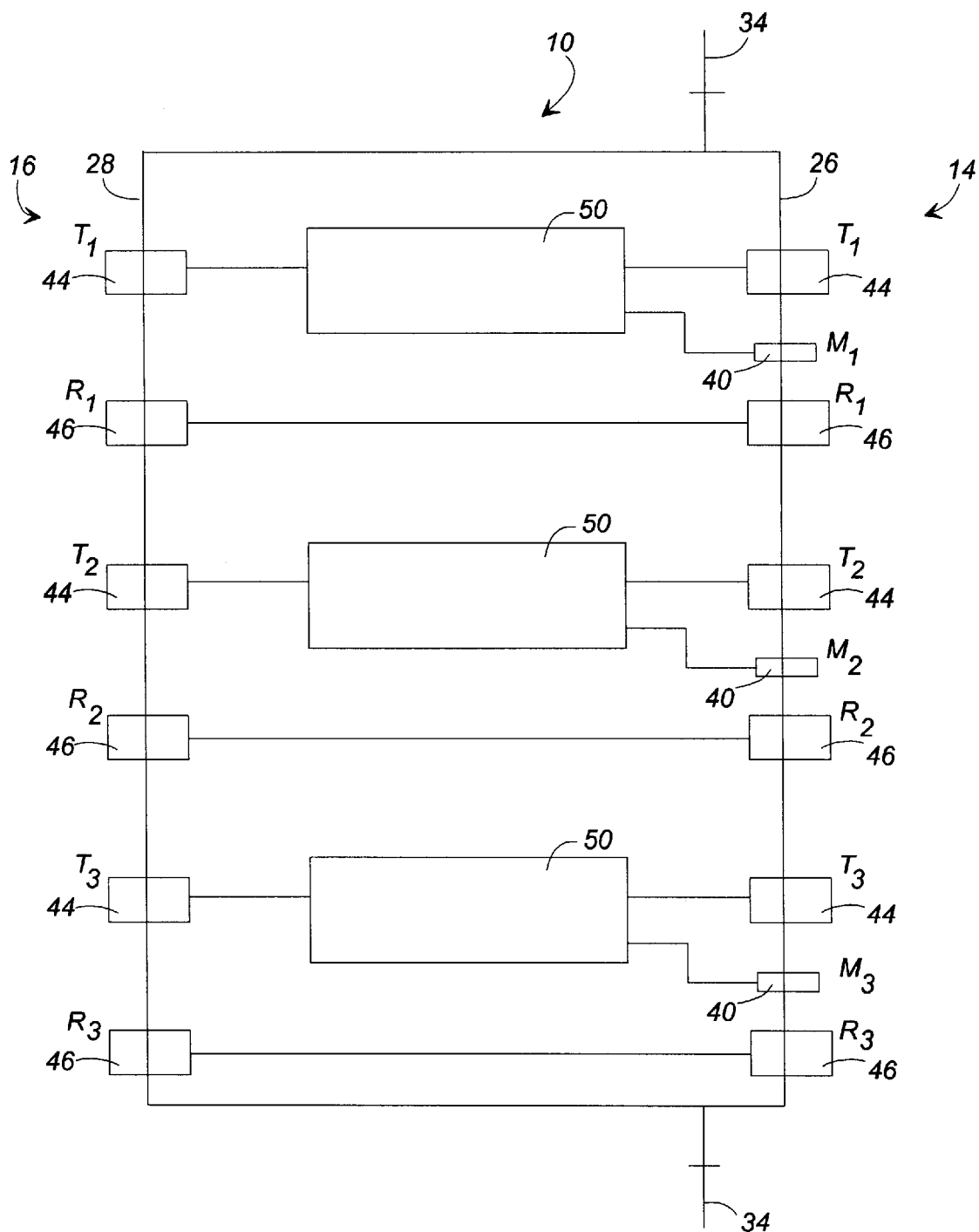
FIG. 3 is a schematic diagram of the crossconnect module shown in FIGS. 1 and 2.

With reference to FIG. 3, a fiber connection schematic diagram of the crossconnect module 10 is illustrated. In this figure, the crossconnect module 10 is represented in a side view with the front side 14 of the module located to the right in the drawing and the rear side 16 of the module located to the left in the drawing. As is indicated in this figure, the transmitting and receiving connectors 44 and 46 are provided with the designation T and R, respectively. Additionally, the different pairs of circuit connectors are provided with numerical designations to identify them as each pertaining to one of three pairs on each side of the module 10. Accordingly, for example, the top two circuit connectors on both sides of the crossconnect module 10 are identified as $T_1$ and $R_1$, respectively. As shown in the schematic, the receiving connectors 46 of the front and rear sides 14 and 16 are directly connected to each other through the crossconnect module 10. However, in between each linked pair of transmitting connectors 44 is an optical beam splitter 50 that divides the signal travelling between the connectors into two paths. One portion of the split signal transmitted from the rear side transmitting connector 44 is directed to the front side transmitting connector 44, while the other portion of the split signal is diverted to one of the monitoring connectors 40 mounted within the front panel 26. One such monitoring connector 40 is connected to each beam splitter 50 such that a portion of each transmit, or output, signal is diverted to one of the monitoring connectors. In one embodiment, 90% of the output signal is transmitted uninterrupted between the transmitting connectors 44, while 10% of the signal is diverted to the associated monitoring connector 40. So arranged, the output signals travelling from one transmitting connector 44 to another can be monitored with an appropriate monitoring device (not shown) without appreciably disrupting the signal.

The primary components of the connector module 10 having been described in the foregoing, operation of the crossconnect module 10 will now be discussed. In use, the crossconnect module 10 can be used to facilitate monitoring of an output signal transmitted from one fiber optic cable to another. To effect evaluation of this output signal, a technician can simply run a jumper cable from an appropriate monitoring device to the particular monitoring connector 40 associated with the particular circuit that is to be tested. In that optical beam splitters 50 are integrated into the crossconnect module 10, interruption of the transmission signal is unnecessary. In addition, because of this integration, the connection of a multiplicity of jumper cables is not needed, thereby greatly simplifying the evaluation procedure so that an accurate assessment can be made by a technician. In a scenario in which, for example, a customer reports a loss of signal or data corruption, each connection point along a transmission path can be evaluated in this manner to determine where along the path the problem is occurring.

Figure 4:
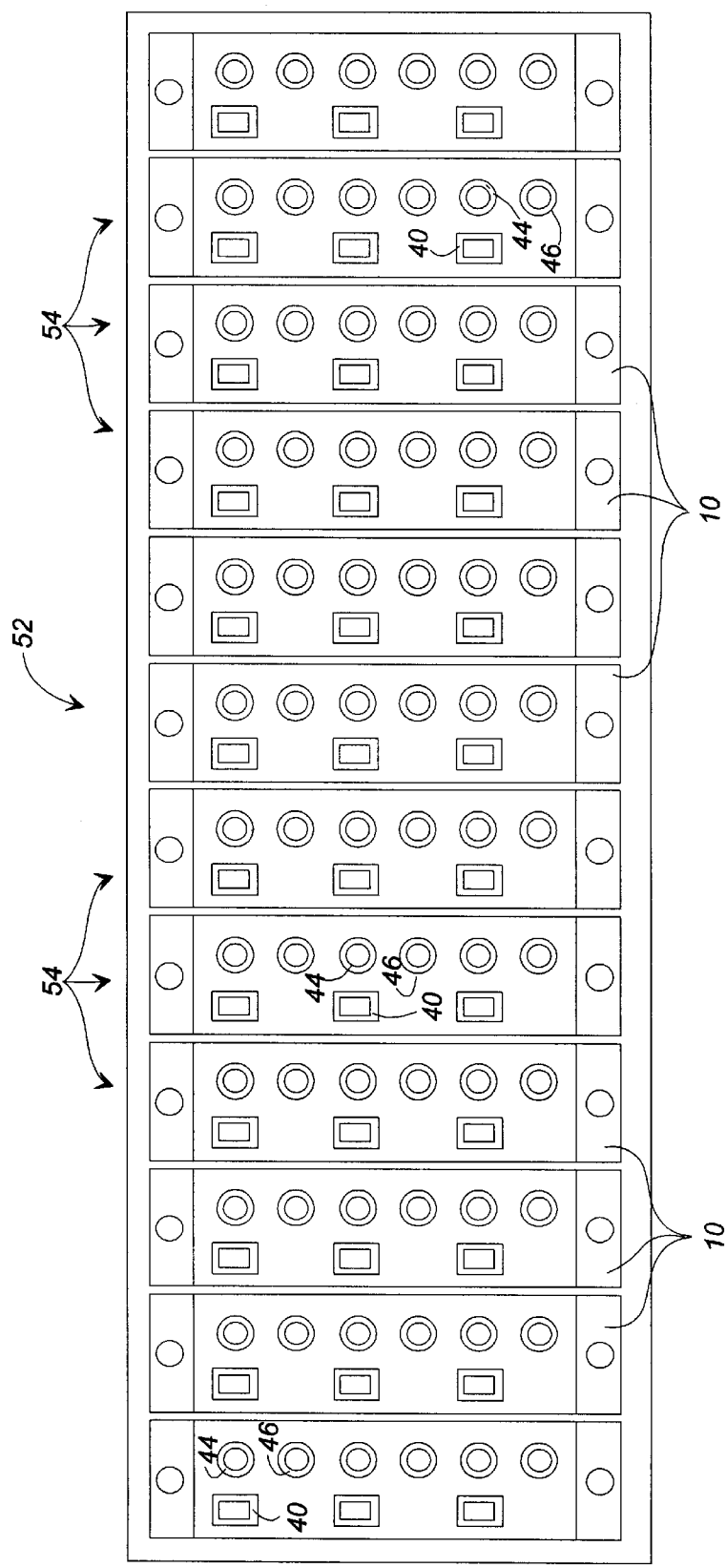
FIG. 4 is a schematic view of a bay panel provided with a plurality of the crossconnect modules shown in FIG. 1–3.

FIG. 4 schematically illustrates a single bay panel 52 provided with a plurality of crossconnect modules 10 such as those shown in FIGS. 1–3 and described in the foregoing paragraphs. As is illustrated in this figure, each station 54 of the panel 52 can house a crossconnect module 10 such that every circuit within the panel can be non-intrusively monitored in the manner described hereinbefore. Accordingly, with the arrangement shown in FIG. 4, monitoring of every panel circuit can be effected in a passive, non-intrusive manner so that problem areas can be isolated without interrupting transmissions to the customer. In that, as illustrated in this figure, the crossconnect modules 10 are adapted for direct installation into the standard bay panels 52, existing bay panels can be retrofitted with the crossconnect modules 10 so that additional panel space need not be occupied by separate monitoring devices. Accordingly, with the crossconnect module 10 of the present invention, the optical fiber density of existing networks can be maintained while also providing signal monitoring capability. By way of example, 12 such crossconnect modules 10 can be installed within a standard panel such as an LGX crossconnect panel currently available from Lucent Technologies Inc. In such an arrangement, the connection of 36 different circuits can be facilitated as well as monitored as desired.

While particular embodiments of the invention have been disclosed in detail in the foregoing description and drawings, it will be understood by those skilled in the art that variations and modifications thereof can be made without departing from the spirit and scope of the invention as set forth in the following claims. In particular, while certain types of components and certain numbers of such components are identified herein by way of example, it is to be appreciated that alternative types and numbers of such components could be used with equally successful results.

What is claimed is:

1. A crossconnect module, comprising:
 a housing adapted for mounting within a crossconnect panel;
 pairs of first and second transmitting connectors mounted to said housing, each pair of first and second transmitting connectors being connected to each other via first transmission paths that extend between said transmitting connectors within said housing;
 pairs of first and second receiving connectors mounted to said housing, each pair of first and second receiving connectors being connected to each other via second transmission paths that extend between said receiving connectors within said housing;
 monitoring connectors mounted to said housing;
 signal splitters disposed within said housing, one signal splitter disposed along each of said first transmission paths; and
 third transmission paths extending from said signal splitters to said monitoring connectors;
 wherein a portion of a signal transmitted along each one of said first transmission paths is diverted by one of said signal splitters to one of said third transmission paths so that the diverted portion of the signal is monitorable by connecting a monitoring device to one of said monitoring connectors.

2. The module of claim 1, wherein said first transmitting connectors are located on a front side of said housing and said second transmitting connectors are located on a rear side of said housing.

3. The module of claim 1, wherein said first receiving connectors are located on a front side of said housing and said second receiving connectors are located on a rear side of said housing.

4. The module of claim 1, wherein said monitoring connectors are located on a front side of said housing.

5. The module of claim 1, wherein the signal splitters divert approximately 10% of the signals to the monitoring connectors.

6. The module of claim 1, wherein said housing comprises at least one mounting flange that includes a fastener with which said module is mountable within the panel.

7. A crossconnect panel, comprising:
- a plurality of panel stations each adapted to receive a crossconnect module; and
- at least one crossconnect module housed within one of said panel stations, the module including
  - a housing,
  - first and second transmitting connectors mounted to said housing and being connected to each other via a first transmission path,
  - first and second receiving connectors mounted to said housing and being connected to each other via a second transmission path,
  - a monitoring connector mounted to said housing,
  - a signal splitter disposed within said housing along one of said first and second transmission paths; and
  - a third transmission path extending from said signal splitter to said monitoring connector.

8. The module of claim 7, wherein said signal splitter is disposed along said first transmission path.

9. A method of monitoring a transmission signal, comprising the steps of:
- providing a crossconnect module having multiple circuits that carry multiple output signals and a signal splitting device for each circuit;
- arranging the crossconnect module such that a portion of each output signal transmitted through the module is diverted by a signal splitting device to one of multiple monitoring connectors of the crossconnect module;
- inserting the crossconnect module in a crossconnect panel; and
- transmitting multiple output signals through said module and monitoring these signals via the monitoring connectors.

10. The method of claim 9, wherein the crossconnect module is arranged so that an output signal is diverted by the signal splitting device.

* * * * *